May 15, 1951     V. R. KLOTZ     2,552,977
BICYCLE CARRIER FOR AUTOMOBILES
Filed Oct. 3, 1947
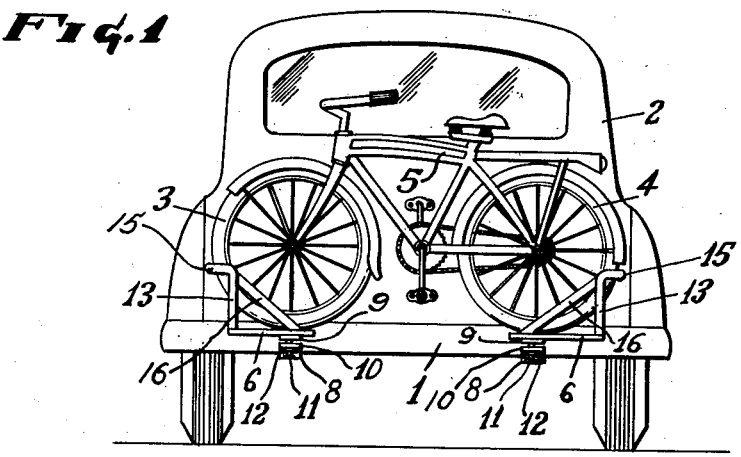
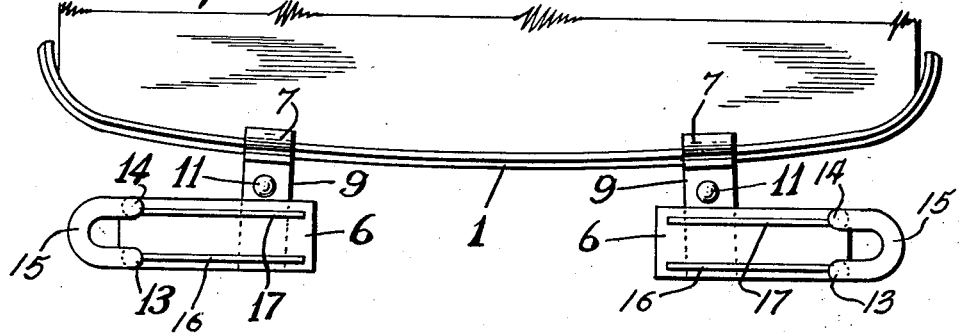
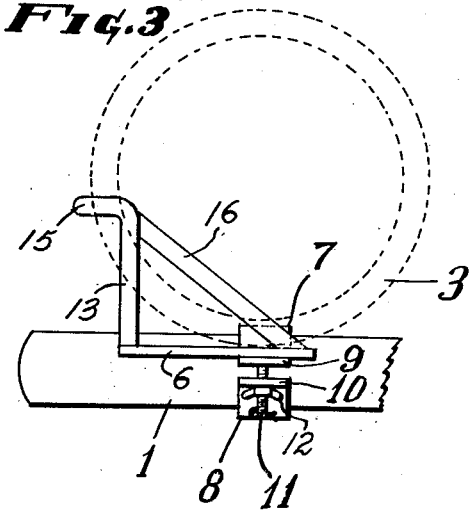
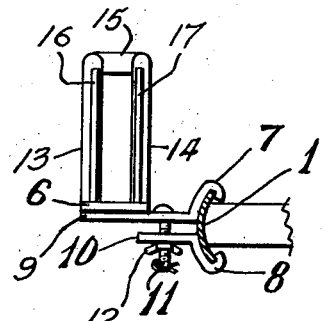
INVENTOR.
VIRGIL R. KLOTZ.
BY Patented May 15, 1951

2,552,977

UNITED STATES PATENT OFFICE 2,552,977

BICYCLE CARRIER FOR AUTOMOBILES

Virgil R. Klotz, Wichita, Kans.

Application October 3, 1947, Serial No. 777,735

2 Claims. (Cl. 224—42.03)

This invention relates to a bicycle carrier for automobiles, and has for its principal object the provision of rack means to receive the wheels of a bicycle therein for transporting the bicycle conveniently from place to place as applied to a motor-driven vehicle externally thereof.

A further object of this invention is to provide a carrier for bicycles that is suitably clamped to the front or rear bumper of an automobile, preferably the rear bumper to avoid obstructions extending from the sides of said automobile whereby traffic hazards are eliminated as well as free operation of the doors of the automobile is retained.

A still further object of this invention is to provide a bicycle carrier having a pair of racks spaced apart, adjustably secured to the bumper of an automobile, and extending upwardly therefrom, the wheels of the bicycle being vertically retained as inserted in the racks and being spaced from the body of the automobile to avoid marring thereof.

These and other objects will hereinafter be more fully explained, reference being had to the accompanying drawing forming a part of this specification, and in which like characters will apply to like parts in the different views.

Referring to the drawing:

Fig. 1 is a rear view of an automobile illustrating the application of my invention.

Fig. 2 is an enlarged plan view of an automobile bumper with my bicycle carrier attached thereto.

Fig. 3 is an external side view of an automobile bumper fragmentarily shown and being enlarged, and having one rack of the carrier applied thereto.

Fig. 4 is a transverse view of Fig. 3 looking into the inner end of the rack.

The invention herein disclosed relates to a bicycle carrier applied to vehicles, and is for the purpose of retaining bicycles conveniently and externally of a vehicle when transporting the bicycles from place to place.

It is commonly known that to transport a bicycle the same is not easily handled due to its pivotal connection of the front steering wheel and protrusions such as the handle bars and foot pedals extending laterally from the sides of the bicycle, and therefor I have provided a definite and simple means to retain the bicycle in its vertical position externally of an automobile.

It will be seen in the drawing that the invention consists of a pair of racks spaced apart and secured preferably to the rear bumper 1 of an automobile 2 to receive their respective wheels 3 and 4 of a bicycle 5 as shown in Fig. 1.

The two racks are identical in construction except one is for the left side of the vehicle while the other rack is for the right side thereof, consequently like characters are applied to corresponding parts of the two racks.

Each rack comprises a horizontal and an elongated plate 6 upon which rests a wheel of a bicycle. The plate is supported a spaced distance from the bumper by a clamp that comprises a pair of jaws 7 and 8, which in turn are provided with rearwardly extending bar portions 9 and 10, respectively, the bar portion 9 being increased in length and integrally joined to the plate 6 substantially at right angle thereto as shown in Figs. 2, 3, and 4. To clamp the jaws to the bumper is through the medium of a bolt and wing nut 11 and 12, respectively, the bolt extending through the bar portions 9 and 10 adjacent the jaws as shown in Fig. 4.

Extending upwardly and being integral with the outer end of the plate 6 is a pair of spaced tubular members 13 and 14, the upper ends of said members being connected by a U-shaped rest 15 that extends at right angle therefrom in an outwardly direction and in which seats the tire of a bicycle wheel. Slantingly positioned braces 16 and 17 are provided for the upwardly extending members 13 and 14, one pair of corresponding ends of the braces being integral with the upper ends of the members 13 and 14, respectively, while the other pair of ends of the braces are integral with the plate 6 adjacent the clamp.

The U-shaped rest 15 is for the purpose of retaining the bicycle from longitudinal movement when the bicycle is being transported, while the braces and the upwardly extending members 13 and 14 as spaced apart will avoid side movement of the bicycle wheels. It will be further understood that the racks may be moved toward and from each other to accommodate for various sides of bicycles, and the bicycles' wheels may be further suitably secured in the racks by the employment of flexible straps to avoid upward movement of the bicycle when traveling over rough roads, said straps not being shown in the drawing but such may be used when desired.

While I have shown and described the invention specifically, the same may be altered therefrom with respect to the exact construction, proportion and arrangement of parts without departing from the spirit of this invention and as lie within the scope of the appended claims.

Having fully described my invention what I claim as new and desire to secure by Letters Patent is:

1. A bicycle carrier for automobile bumpers consisting of a pair of spaced racks, each rack comprising a horizontally positioned and elongated member upon which is seated its respective wheel of a bicycle, a pair of jaws and a bolt to clamp the jaws adjacent one end of a vehicle bumper, a pair of horizontal bar portions extending from their respective jaws, one bar being means upon which the first said member is positioned and secured, a pair of vertical members spaced apart and having their lower ends joined to one end of first said member, and a U-shaped seat, its ends thereof being joined to their respective upper ends of the vertical members, said U-shaped seat extending horizontally opposite from that of the first said member to receive a peripheral portion of said bicycle wheel therein.

2. A bicycle carrier attachable to a rear vehicle bumper, said carrier consisting of a pair of racks, said racks being secured adjacent their respective ends of said bumper, each rack comprising a horizontal member in parallelism with the bumper, a pair of jaws and bars attached to their respective end of the bumper, one bar extending rearwardly from the bumper and being joined to the first said member to support the rack, a pair of spaced and vertically positioned members having their lower ends joined to the outer ends of their respective first said members, a U-shaped seat extending horizontally from the upper ends of its vertical members and being secured thereto, said U-shaped seats extending from each other with respect to the racks to receive a peripheral portion of their respective bicycle wheel therein for retaining the bicycle against side and longitudinal movement when placed in the carrier.

VIRGIL R. KLOTZ.

REFERENCES CITED

The following references are of record in the file of this patent:

UNITED STATES PATENTS

| Number | Name | Date |
|---|---|---|
| 574,629 | Phillips | Jan. 5, 1897 |
| 2,210,272 | Turner | Aug. 6, 1940 |
| 2,431,400 | Iverson | Nov. 25, 1947 |

FOREIGN PATENTS

| Number | Country | Date |
|---|---|---|
| 15,756 | Great Britain | Aug. 21, 1895 |
| 93,810 | Sweden | Dec. 14, 1938 |
| 99,081 | Sweden | June 4, 1940 |
| 298,351 | Italy | Apr. 17, 1931 |